(12) United States Patent
Hendriks et al.

(10) Patent No.: US 7,545,575 B2
(45) Date of Patent: Jun. 9, 2009

(54) OPTICAL ELEMENT FOR CORRECTING REFRACTIVE INDEX RELATED ABBERATIONS

(75) Inventors: Bernardus H. W. Hendriks, Eindhoven (NL); Stein Kuiper, Vught (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 296 days.

(21) Appl. No.: 10/599,337

(22) PCT Filed: Mar. 24, 2005

(86) PCT No.: PCT/IB2005/051018

§ 371 (c)(1),
(2), (4) Date: Sep. 26, 2006

(87) PCT Pub. No.: WO2005/096033

PCT Pub. Date: Oct. 13, 2005

(65) Prior Publication Data

US 2008/0247052 A1    Oct. 9, 2008

(30) Foreign Application Priority Data

Mar. 30, 2004   (GB)   ................... 0407234.4

(51) Int. Cl.
*G02B 3/14* (2006.01)
(52) U.S. Cl. ..................... 359/666; 359/665

(58) Field of Classification Search ............... 359/665, 359/666
See application file for complete search history.

(56) References Cited

U.S. PATENT DOCUMENTS

| 5,446,591 | A | 8/1995 | Medlock |
| 5,731,907 | A | 3/1998 | Sigler |
| 6,891,679 | B2 * | 5/2005 | Atarashi et al. ............. 359/666 |
| 2001/0017985 | A1 | 8/2001 | Tsuboi et al. |

FOREIGN PATENT DOCUMENTS

WO   2003069380 A1   8/2003

OTHER PUBLICATIONS

S. Kuiper; "Variable-Focus Liquid Lens for Miniature Cameras", Applied Physics Letters, vol. 85, No. 7, Aug. 16, 2004, pp. 1608-2004, XP001226648.

* cited by examiner

*Primary Examiner*—William C Choi

(57) ABSTRACT

An optical element (1) for correcting refractive index related aberrations comprises a fluid chamber (5) which is provided with an electrode configuration (2,12) and includes a first, electrically conducting, fluid (B) and a second, non-conducting, fluid (A), and an interface (14) between the fluids, the fluids having different Abbe numbers. By applying a voltage (VO to the electrode configuration electrowetting forces are generated, which deform the shape of the interface (14,14') and determine the corrective power.

11 Claims, 4 Drawing Sheets

OPTICAL ELEMENT FOR CORRECTING REFRACTIVE INDEX RELATED ABBERATIONS

The invention relates to an optical element for correction refractive index related aberrations in an optical system.

The invention also relates to an optical system comprising such an element.

Refractive index related aberrations are understood to include aberrations which are due to the wavelength dependency of the refractive index of materials of which optical elements are built, which are known as is chromatic aberrations, and aberrations which are due to changes in the refractive index caused by changes of environmental parameters such as temperature changes.

The optical system may be of many different types and includes a lens system for a number of applications such as in camera or a microscope or in an optical head for scanning optical record carriers.

If in such an optical system optical radiation having more than one wavelength is to be used chromatic aberrations will arise, which have a significant negative influence on the performance of the optical system, i.e degrade the performance of the system. For instance, an imaging system that is not well corrected for chromatic aberrations produces an image, on for example an electronic sensor, which sub-images of different colours are not all in focus. This results in a blurred total image.

A specific problem arises in the field of optical recording, i.e. reading and writing data from an in, respectively an information layer of an optical record carrier by mans of an optical head. If in such a head a blue diode laser, which emits a laser beam with a wavelength of the order of 405 nm, a scanning spot can be formed in the information layer, which is significantly smaller than the scanning spot that can be formed by a conventional red diode laser. With an optical head provided with a blue diode laser information details can be read that are substantially smaller than information details that can be read with a conventional optical head having a red diode laser. The use of a blue diode laser in optical recording thus allows substantially increasing the information density in an optical record carrier. For blue laser recording an objective system having a relatively large numerical aperture (NA), for example 0.45, should be used. Such an objective system is sensitive to refractive index variations due to temperature changes and should comprise means for compensating such changes.

Conventionally, chromatic aberrations are addressed by means of double lens units, known as doublets, which consist of a first lens element of a material which refractive shows a first wavelength dependency and a second lens element of a material which refractive index showing a second wavelength dependency, opposed to the first wavelength dependency. Another known possibility to correct for chromatic aberrations is combining an imaging refractive lens element with a diffraction element which shows a wavelength dependency opposed to that of the refractive lens element.

The known methods for correcting chromatic aberrations are relatively costly and thus increase the costs of the systems wherein they are used. Moreover, they may introduce other optical aberrations. The chromatic correcting elements resulting from the known methods are dedicated elements; i.e. they are only suitable for the optical system for which they are specifically designed.

There is thus a need for a cheap and compact aberration correcting element that is moreover adjustable, or tuneable, such that it can be used in different optical systems and need not to be specifically designed for such systems.

It is an object of the invention to provide such a general compact and low-cost compact chromatic correction element. This element is characterized in that it comprises a fluid chamber, which is provided with an electrode configuration and includes a first, electrically conducting, fluid and a second, non-conducting, fluid, and an interface between the fluid, the fluids having different Abbe numbers and the corrective power of the element being controllable by electrowetting forces generated by voltage applied to the electrode configuration and deforming the shape of the interface.

The element uses the principle of electrowetting, which, for a variable focus lens is described in International patent application WO 03/069380. If a potential is supplied to an electrode below a surface this surface becomes electrowetting and one of the liquids is attracted by the surface, whereby the shape, or curvature, of the interface of the two liquids changes. Since the liquid have different Abbe numbers the chromatic behaviour of the element changes. By controlling the voltage between electrodes of the element its chromatic behaviour can be controlled and adapted to the optical system wherein it is to be used. The Abbe number of an optical material is a measure for the wavelength dependency of the refractive index of an optical material. The Abbe number v of a material is given by: $v=(N_d-1)/(N_f-N_c)$, wherein $N_d$, $N_f$ and $N_c$ are the refractive indices of the material for specific lines of the spectrum; d=587.6 nm, f=486.1 nm and c=656.3 nm.

In the variable focus lens according to WO 03/069380 the electrowetting forces are used to change the optical power of the lens and the difference between the refractive indices of the fluids is as large as possible in order to create maximum optical power for the lens. For sufficient power change relatively large voltages should be supplied between the electrodes. The present correcting element has in principle no optical power and the refractive indices of the fluids are preferably close to each. Since for chromatic correction only a small change in the shape of the interface of the liquids is required the drive voltage is considerably smaller than in the variable focus lens.

It is remarked that U.S. Pat. No. 5,446,591 discloses the use of a liquid lens element in combination with a solid, glass, lens element to correct for the chromatic aberrations of the solid element. However the liquid element comprises only one liquid and thus does not use the change of an interface of two liquids to change the chromatic properties. The lens of US-A uses another principle and has another construction than the element of the present invention.

This element is preferably characterized in that the first and second fluids have substantially the same refractive index.

The optical power of this element remains zero even if the interface between the fluids is curved to provide a required chromatic aberration correction. This element can be inserted in an existing optical system without re-design of this system.

A practical embodiment of the optical element is characterized in that it comprises a first electrode connected to the first fluid and a second electrode arranged on the inner side of the fluid chamber wall.

This embodiment may be further characterized in that the inner side of the fluid chamber wall facing the fluids is covered by an insulating layer.

To prevent that fluid sticks to the chamber wall at positions where it should not be, the optical element may be characterized in that the insulating layer is covered by a hydrophobic layer.

Alternatively, the element may be characterized in that the insulating layer is hydrophobic.

Preferably the optical element is characterized in that the first fluid is salted water and the second fluid is oil.

These liquids, which are used in electrowetting lenses, are very suitable for the correcting element.

The invention also relates to an image-capturing device comprising a lens system and an image-receiving unit. This device is characterized in that the lens system comprises an optical element as described herein above.

In a camera comprising such an image-capturing device the invention is also implemented so that such a camera forms also part of the invention.

The invention also relates to a hand-held apparatus comprising such a camera.

Such a hand-held apparatus may be a mobile phone.

The invention also relates to an optical head for scanning an information layer and comprising a radiation source unit for supplying a scanning beam, an optical lens system for focusing the scanning beam in the information layer and a radiation-sensitive detection unit for converting scanning beam radiation from the information layer into electrical signals. This optical head is characterized in that the lens system comprises an optical element as described herein before.

These and other aspects of the invention will be apparent from and will be elucidated, by way of non-limitative example, with reference to the embodiments described hereinafter. In the drawings.

Figure 1:
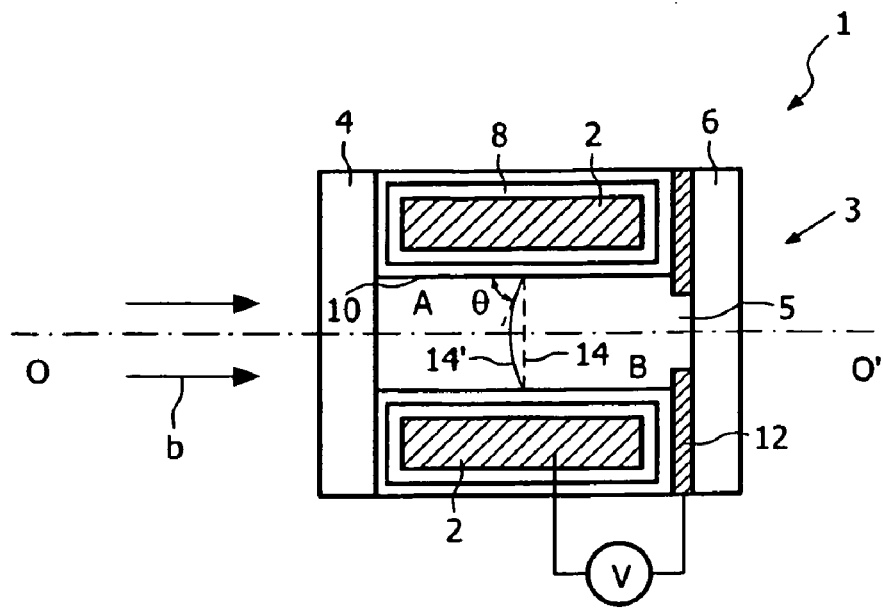
FIG. 1 shows a cross-section of an embodiment of a correcting element according to the invention.

The element 1 shown in FIG. 1 comprises a cylindrical first electrode 2 forming a capillary tube. This tube is sealed by means of a transparent front element 4 and a transparent back element 6 to form a fluid chamber 5 containing two fluids A and B. the electrode 2 may be an electrically conducting coating applied on the inner wall of the tube 3.

The fluids consists of two non-miscible liquids in the form of an electrically insulating first fluid liquid A, such as an oil, and an electrically conducting second liquid B, such as water containing a salt solution. Preferably, the two liquids have equal density so that the element 1 functions independently of orientation, i.e without dependence on gravitational effects between the liquids.

The electrode 2 is coated by an electrically insulating layer 8, for example of parylene. This layer is coated with a hydrophobic layer 10, which prevents sticking of the fluid to the chamber wall.

A second, annular, electrode 1 is arranged adjacent the back element 6 with at least a portion in the fluid chamber 5 such that this electrode acts on the second fluid B.

The two liquids A and B are non-miscible so that they form two fluid volumes, which are separated by an interface 14. The two liquids have different Abbe numbers. Preferably the refractive indices of the liquids are as far as possible equal to each other.

In a neutral state of the element, for example if no voltage from a voltage source 16 is applied between the electrodes 2 and 12, the interface 14 is straight, i.e. not curved as shown in FIG. 1 by the broken line 14. In this state the element 1 can be compared with a thick plan parallel plate, which passes a radiation b perpendicularly incident along an optical axis OO' without changing the wavefront of the beam. If a voltage is applied between the electrodes 2 and 12, electrowetting force is generated by electrode 2. Due to electrowetting, the wettability of the layer 10 by the second liquid B changes. In a similar way as described in the above mentioned WO 03/069380. Thereby the contact angle θ of the interface at the three-phase line, i.e. the line of contact between the layer 10 and the two liquids A and B changes. As a consequence, the shape of the interface changes, i.e. the interface becomes slightly curved, as shown by the solid line 14' in FIG. 1. In an activated state, i.e. a voltage is applied between the electrodes 2 and 12; the element includes a curved surface and is no longer optically neutral. Since the liquids at the two sides of the interface have different Abbe numbers and since the interface is curved the element has become sensitive to wavelength variations. In other words, the element has become a chromatic element, which may be used, in optical system to compensate for the chromatic behaviour of other elements in such a system.

Figure 2A:
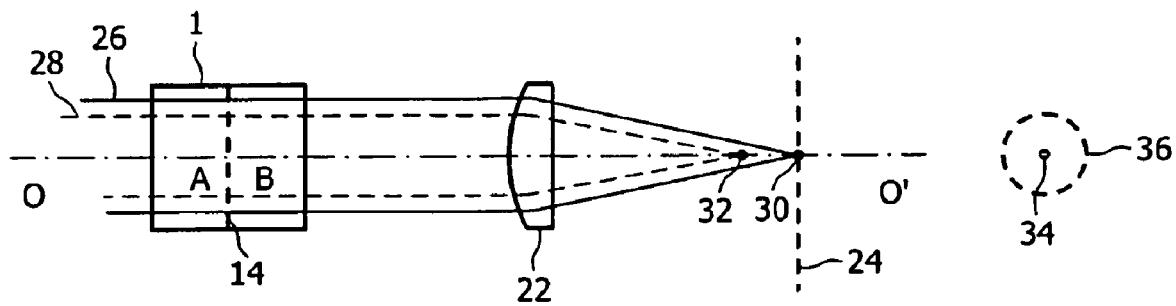
FIGS. 2a and 2b show how the correcting element corrects for chromatic aberrations.
Figure 2B:
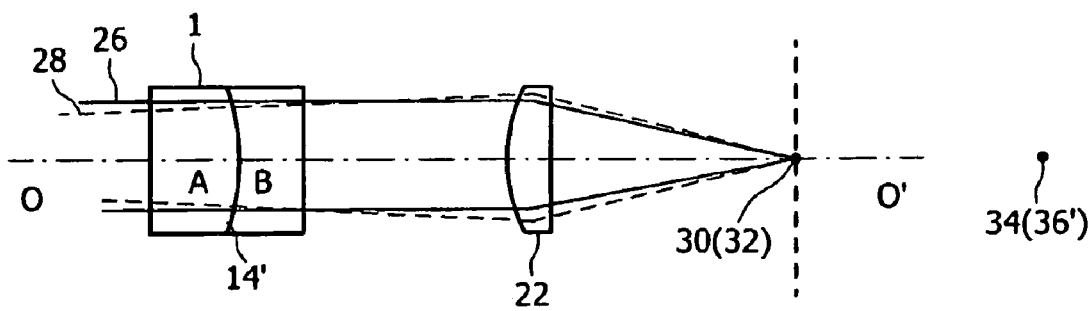

The effect this element has on the optical system is, very schematically, shown in FIGS. 2a and 2b. The optical system is a simple optical system comprising a lens system, represented by a single lens element 22, which has an optical axis OO' and a focus plane 24. The correction element 1 according to the invention is arranged in front of the lens system 22. This lens system shows chromatism, which means that components of a beam b, which have different wavelengths will be focused in different axial positions. These beam components 26 and 28 are represented by the border rays 26 and 28, drawn in solid lines and broken lines, respectively.

If the correction element is not active, i.e. the interface 14 is straight, beam portion 26 is focused in point 30, thus in the focus plane, while beam portion 28 is focused in a point 32 outside the focus plane 24. In the focus plane, perpendicular to the optical axis and to the plane of drawing of FIG. 2a, the beam portion 26 for which wavelength the lens system 22 is designed forms a point like spot 34, while the beam portion 28 forms a circular spot. These spots are shown in the right hand portion of FIG. 2a. If, as shown in FIG. 2b, the correcting element is activated, i.e. the interface curved to the required degree, this element introduces a chromatic aberration, as indicated by deflection of the rays 28 at the interface. By applying an appropriate voltage between the electrodes of the element 1, the chromatic aberration introduced by this element compensates for the chromatic aberration of the lens system 22. The beam portions focused in plane 24 and in this plane equal spots 34 and 36' are formed, as shown in the right hand portion of FIG. 2b Although in FIGS. 2a and 2b (for clarity reason) the border rays of the beam portion 26 and 28 are shown shifted with respect to each other and passing the lens system at different heights, in reality the border rays of these beam portions coincide and pass the lens system 22 at the same height.

In a practical embodiment of the lens system of FIGS. 2a and 2b this system comprises a single piano convex lens element made of glass of the type BK7 and the radius of curvature of the convex surface is 6 mm. The chromatic aberration of this lens element can be compensated by element 1 if the interface has a radius of curvature equal to ~9.67 mm. The first, insulating, liquid may be an oil of the type decamethylcyclopentasiloxane, which has a refractive index N=1.398 and an Abbe number V=55.5. The second, conducting liquid may be salted water having a refractive index N=1.38 and an Abbe number V=38.0.

Since the chromatic-correction power of the element 1 is determined by the voltage applied between its electrodes this power can be easily adapted to the optical system wherein the element will be used. In this way a flexible element is obtained that can be uses in a lot of different optical systems. Since, due to the choice of the fluids A and B, for example liquids, the refractive power of the interface, thus the optical power of the correcting element, is negligible this element can be inserted in optical systems, without re-designing this systems.

Figure 3:
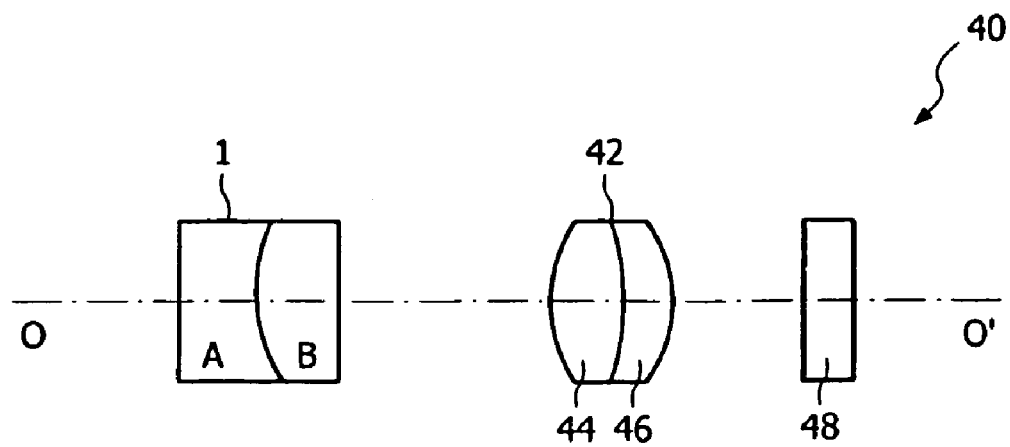
FIG. 3 shows an image-capturing device comprising a the correcting element.

The correcting element may be very compact and is thus suitable in a miniature image-capturing device. The principle of such a device is shown in FIG. 3. The image capturing device 40 comprises an objective lens system 42, which may be a single bi-convex lens element having, for example one or two aspherical surface or a system of two lens elements 44, 46, having an optical axis OO'. The device 40 further comprises an image receiving unit 48, which receives the image formed by the objective system 42 of a scene or object at the left hand side of the objective system. The unit 48 may be an opto-electronic sensor, such as a CCD sensor or a CMOS sensor, but also a photographic film. In front of or behind the objective system a correcting element as described with respect to FIG. 1 is arranged, which compensates the chromatic aberrations of the objective system so that the image-capturing device is a-chromatic and suitable for colour pictures.

The image-capturing device can be completed in a conventional way with camera modules such as control modules, for example an automatic focusing system, and image-processing module in case of a digital camera.

Figure 4:
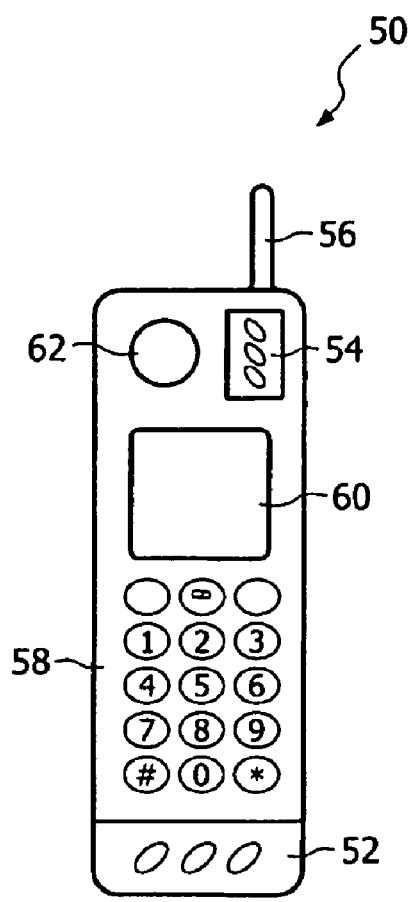
FIG. 4 shows a mobile phone comprising a camera wherein the invention is implemented.

The camera may be a miniature camera, which can be included in a hand-held apparatus. FIG. 4 shows an example of a hand-held apparatus including a camera, wherein the invention is implemented. The apparatus is a mobile phone 50 shown in a front view in FIG. 4. The mobile phone comprises a microphone 52, which inputs the user's voice as data, a loudspeaker 54, which outputs the voice of a communicating partner and an antenna 56, which transmits and receives communications waves. The mobile phone further comprises an input dial 58, by means of which the user puts information, such as phone number to be dialled, and a display 60, for example a liquid crystal display panel. The display panel may be used to display a photograph of the user's communicating partner or to display data and graphics. For processing the input data and the received data, a data processing (not shown) is included in the mobile phone.

The mobile phone is provided with a miniature camera 62, comprising a chromatism-correcting element as described herein above. Of this camera only the front surface of the first optical element, which may the correcting element or the objective lens, is shown. The elements of the camera such as the objective lens the correcting element and the image sensor may be arranged along a line perpendicular to the front surface of the mobile phone, i.e. in the direction perpendicular to the plane of drawing of FIG. 4, if the dimension of the mobile phone in this direction is large enough. Alternatively, the camera may be provided with one or more folding mirror(s) so that a substantial portion of the optical path of the camera can be arranged parallel to the front surface of the mobile phone, which then may be relatively thin.

Other hand-held apparatus wherein the invention may be implemented are for example a personal digital assistant (DPA), a pocket computer or an electronic toy, wherein miniature cameras are built-in.

The invention may also be implemented in non-built-in cameras, like Web cameras, cameras for intercom systems and pocket-sized and other sized cameras, for example digital cameras. For the invention it is irrelevant whether the camera uses a film or an electronic sensor.

Figure 5:
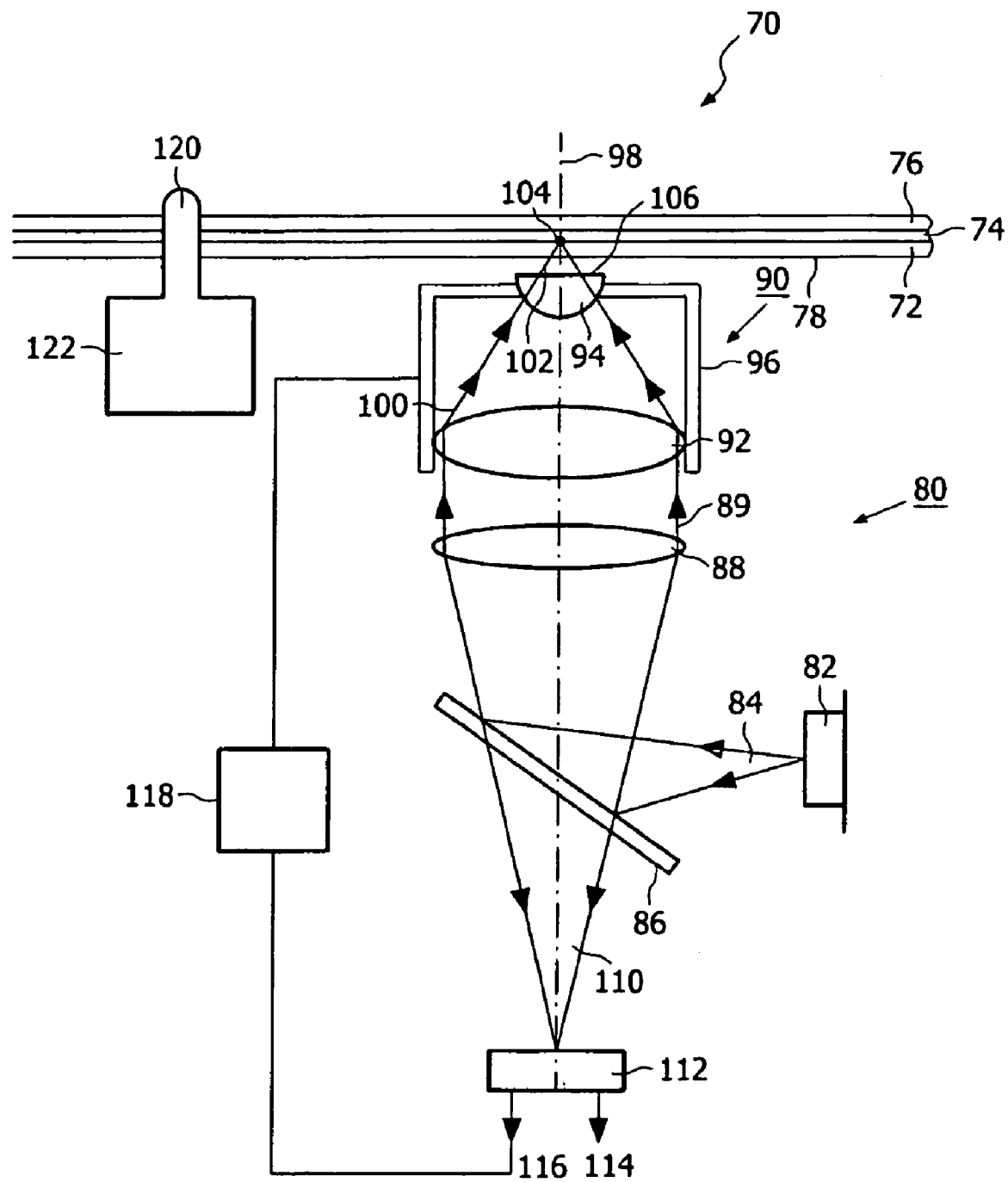
FIG. 5 shows an embodiment of an optical head wherein the correcting element can be used.

The correcting element can be used advantageously also in an optical head 80 for scanning, i.e. reading and/or writing, an optical record carrier 70, which record carrier and optical head are shown in cross-section in FIG. 5. The record carrier is, for example a disc shaped record carrier and comprises a transparent layer 72, on one side of which an information layer 74 is arranged. The side of the information layer facing away from the transparent layer 72 is protected from environmental influences by a protection layer 76. The side of the transparent layer facing the optical head 80 is called the entrance face 78. The transparent layer 72 acts as a substrate of the record carrier 70 and provides mechanical support for the information layer 74.

Alternatively, the transparent layer 72 may have the sole function of protecting the information layer 74, while the mechanical support is provided by a layer on the other side of the information layer 74, for instance by the protection layer 76 or by a further information layer and a transparent layer arranged on the information layer.

Figure 6:
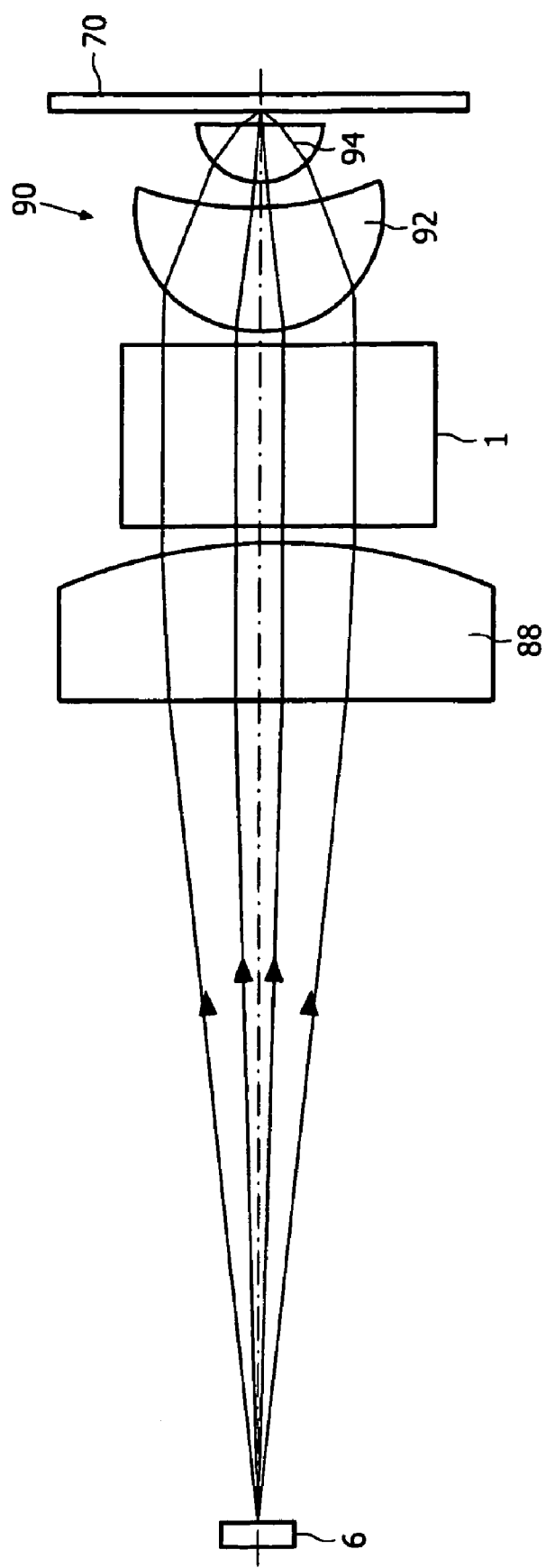
FIG. 6 shows a portion of the radiation path of the optical head comprising the correcting element.

Information may be stored in the information layer 74 of the record carrier in the form of optically detectable marks arranged in substantially parallel, concentric or spiral, information tracks, not indicated in FIG. 6. The marks may be in any optically readable form, e.g. in the form of pits, or areas with a reflection coefficient or a direction of magnetisation different from their surroundings, or a combination of these forms.

The optical head 80 comprises a radiation source 82, preferably a semiconductor laser, or diode laser, that emits a radiation beam 84. A beam splitter 86, for example a semi-transparent mirror, reflects the diverging beam 84 towards a collimator lens, which converts this beam into a collimated beam 89. The collimated beam is incident on an objective lens system 90 having an optical axis 98. The objective lens system comprises an objective lens 82 and a piano-convex lens 94. The objective lens and the plano-convex lens are included in an objective holder 96. The objective lens converts the collimated beam 89 into a converging beam 100, which is incident on the lens 94. This lens converts the beam 100 in a converging beam 102 the focus of which is situated in the information layer 74.

The lens 94 has a convex surface facing the objective lens 92 and a plane surface facing the record carrier. The surface facing the record carrier is spaced from the record carrier by a slit 106. The objective lens 92 is shown as a single lens element, but may also comprise more lens element and/or a diffraction element. Also the collimator lens 88 may comprise more lens elements.

By using the collimator lens in the optical head the object, i.e. the emitting surface of the radiation source 82, and the image, i.e. the scanning spot 104 are conjugated at infinity and the objective system receives a collimated beam. The collimator lens can also be left out the system so that a diverging beam enters the objective system. Including a collimator lens in the system makes the design of the objective system easier.

During writing and reading of data the record carrier is rotated by means of an axis 122 driven by a motor 120 so that an information track in the information layer is scanned. By moving the scanning spot 104 and the record carrier relative to each other in the direction perpendicular to the plane of drawing, all concentric tracks or the whole spiral track is scanned. This movement can be realised by arranging the optical head, or a portion thereof comprising at least the objective system, on a sled, which moves in said direction.

During reading of recorded data radiation of the beam 102 reflected by the information layer is modulated by the information in successive information marks. This radiation travels back to the beam splitter 86, which passes portion of this radiation as beam 110 to a radiation-sensitive detection unit 112. This unit converts the incident radiation into electrical signals. One of these signals is in the information signal 112, which represents information, read out from the record carrier. Another signal is a focus error signal 116, which represents an axial displacement of the scanning spot 104 with respect to the information layer 74. This signal, which can be generated by means of several well-known means, is used as input signal for a focus servo circuit 118, which drives an actuator (not shown) for the objective system such that the axial position of the scanning spot coincides with the plane of the information layer. Another signal supplied by the unit 112 is a track error signal (not shown), which is representative for a deviation between the centre of the scanning spot and the centre line of the track momentarily read. This signal that can be generated also by means of several well-known means, is used as input signal for a tracking servo circuit (not shown), which drives a tracking actuator such that centre of the tracking spot coincides with the centre line of the track being read.

For writing data in the information layer, the beam 84 supplied by the radiation source is intensity modulated according to the data to be written. During writing the same servo systems can be used as during reading.

The objective system 90 of the embodiment of FIG. 5 is especially used for scanning record carriers having a very high Information density. For scanning such a record carrier the beam from the last element of the objective system should have a very large numerical aperture, for example NA=0.85. The objective system 90, comprising an objective lens 92 and the plano-convex lens 94 provides such large numerical aperture. The plano-convex may be arranged on a glider, which glides across the record carrier, or may glide on an air cushion between its plane surface and the record carrier. The lens elements of such an objective system usually comprises one or more aspherical surfaces to correct for aberrations such as spherical aberrations.

From a cost point of view, the lens elements of the objective system are preferably made of transparent plastic or consist of glass bodies provided with plastic, aspherical, layers. However such lens systems are sensitive to temperature variations. Especially the change in refractive index due to temperature variations causes a change in the performance of such lens systems. This problem becomes very manifest in lens systems having a numerical aperture as large as 0.85.

According to the invention this problem can be solved by arranging a correcting element 1 as discussed herein before in the optical path of such a lens system. FIG. 6 shows a portion of the optical head of FIG. 5 wherein a correcting element 1 is inserted between the collimator lens and the objective system, which element has in principle no optical power and only corrects only for refractive index variations.

In case temperature variations also cause changes in the shape of the elements of the objective system such as changes in the curvature of surface or changes in the thickness of the lens elements, which changes influence the performance of the lens system, some corrective optical power can be built-in in the element 1 by including therein fluids A and B which have different refractive indices.

The invention can also be used in optical scanning heads having a numerical aperture smaller than 0.85, which suffer from temperature variations. The objective system of such an optical head may consist of only the objective lens 92 shown in FIGS. 5 and 6, which may comprise only one, for example bi-aspherical, lens element, or a number of lens elements.

The invention has been described at the hand of cameras and optical is heads, which are typically consumer apparatuses. However, the invention can also be used in professional apparatuses, such as optical microscopes and telescopes and other optical apparatuses to improve in a simple way the performance of these apparatuses.

The invention claimed is:

1. An optical element (1) for correcting refractive index related aberrations in an optical system, characterized in that it comprises a fluid chamber (5), which is provided with an electrode configuration (2,12) and includes a first, electrically conducting, fluid (B) and a second, non-conducting, fluid (A), and an interface (14) between the fluid, the fluids having different Abbe numbers and the corrective power of the element being controllable by electrowetting forces generated by a voltage (V) applied to the electrode configuration (2,12) and deforming the shape of the interface (14,14'), and in that the first and second fluids (B,A) have substantially the same refractive index.

2. An optical element as claimed in claim 1, characterized in that it comprises a first electrode (12) connected to the first fluid (B) and a second electrode (2) arranged on the inner side of the fluid chamber wall (3).

3. An optical element as claimed in claim 2, characterized in that the inner side of the fluid chamber wall facing the fluids is covered by an insulating layer (8).

4. An optical element as claimed in claim 3, characterized in that the insulating (8) layer is covered by a hydrophobic layer (10).

5. An optical element as claimed in claim 3, characterized in that the insulating layer (8) is hydrophobic.

6. An optical element as claimed in claim 1, characterized in that the first fluid (B) is salted water and the second fluid (A) is oil.

7. And image-capturing device (40) comprising a lens system (42) and an image-receiving unit (48), characterized in that the lens system comprises an optical element (1) as claimed in claim 1.

8. A camera comprising an image-capturing device (40) as claimed in claim 7.

9. A hand-held apparatus (50) comprising a camera as claimed in claim 8.

10. A hand-held apparatus as claimed in claim 9, wherein the apparatus is a mobile phone (50).

11. An optical head (80) for scanning an information layer (74) and comprising a radiation source unit (82) for supplying a scanning beam (84,90100,102), an optical lens system (88, 90) for focusing the scanning beam in the information layer and a radiation-sensitive detection unit (112) for converting scanning beam radiation from the information layer into electrical signals (114,116), characterized in that the lens system comprises an optical element (1) as claimed in claim 1.

* * * * *